(12) United States Patent
Roman et al.

(10) Patent No.: US 9,989,782 B2
(45) Date of Patent: Jun. 5, 2018

(54) SPECTACLE FRAMES

(71) Applicant: SAFILO Società Azionaria Fabbrica Italiana Lavorazione Occhiali S.P.A., Pieve di Cadore (BL) (IT)

(72) Inventors: Maurizio Roman, Padova (IT); Ampelio Artusi, Padova (IT); Marco Queboli, Padova (IT); Roberto Gorza, Padova (IT)

(73) Assignee: SAFILO—SOCIETÀ AZIONARIA FABBRICA ITALIANA LAVORAZIONE OCCHIALI S.P.A., Pieve di Cadore (BL) (IT)

( * ) Notice: Subject to any disclaimer, the term of this patent is extended or adjusted under 35 U.S.C. 154(b) by 27 days.

(21) Appl. No.: 15/035,441

(22) PCT Filed: Oct. 23, 2014

(86) PCT No.: PCT/EP2014/072760
§ 371 (c)(1),
(2) Date: May 9, 2016

(87) PCT Pub. No.: WO2015/071067
PCT Pub. Date: May 21, 2015

(65) Prior Publication Data
US 2016/0291346 A1 Oct. 6, 2016

(30) Foreign Application Priority Data

Nov. 12, 2013 (IT) .............................. PD2013A0304

(51) Int. Cl.
*G02C 5/22* (2006.01)
*G02C 5/16* (2006.01)
*G02C 5/14* (2006.01)

(52) U.S. Cl.
CPC ........... *G02C 5/2254* (2013.01); *G02C 5/146* (2013.01); *G02C 5/16* (2013.01); *G02C 5/2209* (2013.01);
(Continued)

(58) Field of Classification Search
CPC .......... G02C 5/14; G02C 5/16; G02C 5/2209; G02C 5/2254; G02C 5/143; G02C 5/146; G02C 5/22; G02C 2200/12
(Continued)

(56) References Cited

U.S. PATENT DOCUMENTS 5,359,370 A * 10/1994 Mugnier ................ G02C 5/126
351/111
2008/0297717 A1* 12/2008 Fukuoka .............. G02C 5/2245
351/113
(Continued)

FOREIGN PATENT DOCUMENTS

CN 201281785 Y 7/2009
CN 202735609 U 2/2013
(Continued)

*Primary Examiner* — Jordan Schwartz
(74) *Attorney, Agent, or Firm* — Volpe and Koenig, P.C.

(57) ABSTRACT

A frame for spectacles includes a front frame with lateral projections for articulation of respective temple arms and articulation means between each projection and the corresponding temple projection for articulated connection of the temple projection to the front frame. The articulation means includes a resiliently yielding element independent of the projection and the temple arm. The element having a first extremity attached to the temple arm and a second opposite extremity engaged with predetermined play in an opening passing through the projection. The opening distanced from the free edge of the projection facing the temple arm such that the portion of the projection extending between the edge and the opening remains held between the resilient element and the temple arm in order to perform a hinge movement (Continued)

between the projection and the temple arm through relative movement of the second extremity of the resilient element in the opening.

11 Claims, 6 Drawing Sheets

(52) U.S. Cl.
CPC ..... *G02C 2200/12* (2013.01); *G02C 2200/22* (2013.01)

(58) Field of Classification Search
USPC .......................... 351/119, 121, 111, 113, 114
See application file for complete search history.

(56) References Cited

U.S. PATENT DOCUMENTS

| | | | | |
|---|---|---|---|---|
| 2009/0135370 A1* | 5/2009 | Xiao | ..................... | G02C 1/08 351/140 |
| 2014/0218677 A1* | 8/2014 | Chen | ..................... | G02C 1/04 351/121 |

FOREIGN PATENT DOCUMENTS

| | | |
|---|---|---|
| EP | 2116887 A1 | 11/2009 |
| FR | 1009345 A | 5/1952 |
| JP | 2011095691 A | 5/2011 |
| KR | 10-1468321 | * 12/2014 |
| WO | 2012160154 A1 | 11/2012 |

* cited by examiner

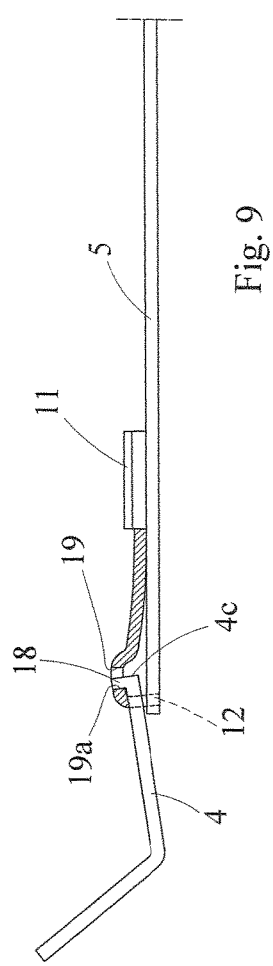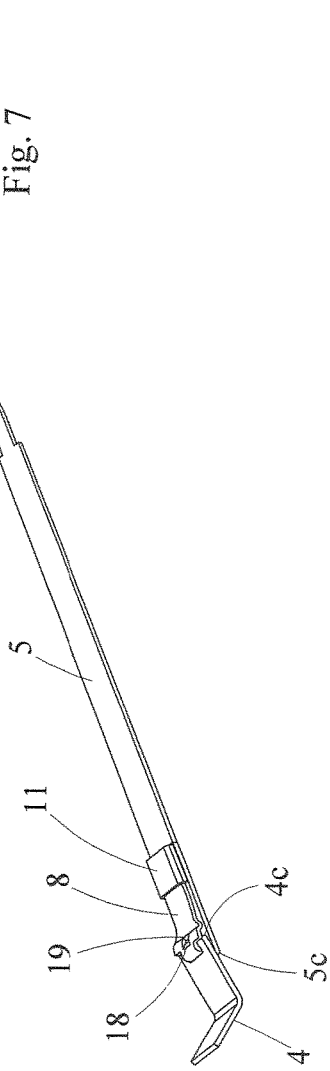

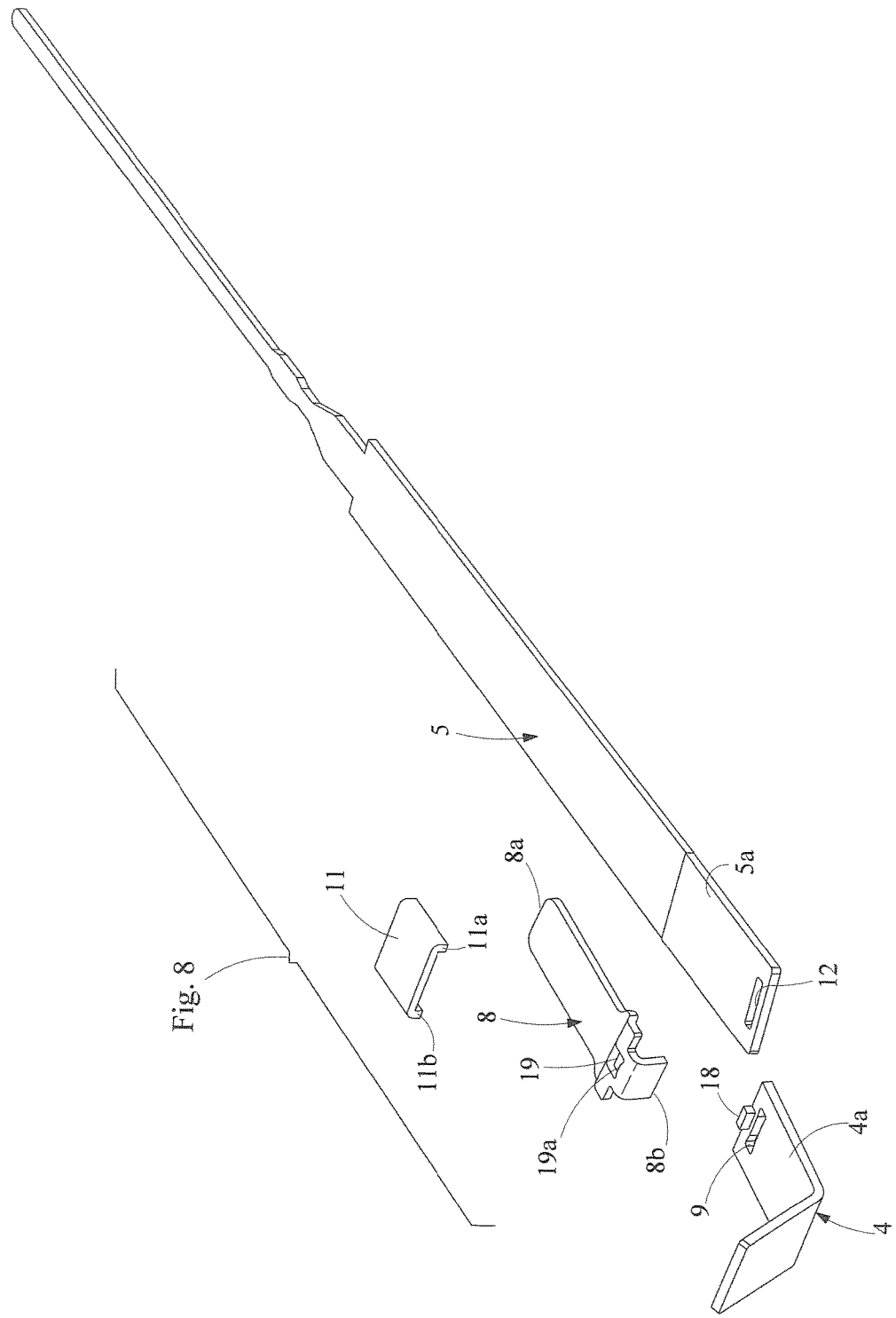

US 9,989,782 B2

SPECTACLE FRAMES

TECHNICAL SCOPE

This invention relates to a frame for spectacles having the characteristics stated in the precharacterising clause of principal claim no. 1.

TECHNICAL BACKGROUND

Within the specific technical field spectacle frames in which the hinge between the temple arms and the front frame is provided by means of hinge devices having corresponding pins and hinge plates rotatably associated together, the components of the hinges of such devices being suitably secured to the temple arm and front frame of the frame, are well known.

In the multiple versions of it provided by the known art this type of arrangement conventionally incorporates some limitations, including possible undesired slackening of the hinge pin or screw, the need to manufacture a plurality of components required for hinge attachments, the dimensions dictated by the components required, in addition to the weight of the hinge device, which is not very suitable for use in frames of the light type.

Arrangements for hinging the temple arm to the front frame of a frame which do not provide a conventional hinge structure of the type mentioned above are also known. One example is known from FR 1009345, in which a hinge system with the temple arm resiliently attached to the front frame is described. This provides that the extremity of the temple arm facing the front frame is divided into three separate parts of sufficient length to provide them with mutual resilient behaviour. The bent extremity of the central part together with the side parts hold the temple arm in an articulated way around a pin formation provided on the frame.

In addition to requiring a particular manufacturing process for the temple arm in order to subdivide it into several parts, such an arrangement is necessarily dependent on the resilient properties of the material of the temple arm.

DESCRIPTION OF THE INVENTION

The principal object of the invention is to provide a spectacle frame with means for articulating the temple arms to the front frame of the frame that are structurally and functionally designed to overcome the limitations mentioned with reference to known solutions and which in particular has a simpler structure of the articulation means for the temple arms which is easy to assemble on the frame and is particularly light and of small dimensions so that it can be applied to particularly slender and light frames.

Another object of the invention is to render the resilient properties of the articulation system for the temple arm independent of the material from which the temple arm is constructed.

Yet another object is to provide a frame provided with articulation means allowing for resilient behaviour when a temple arm is opened excessively wide, beyond the normal angle of opening.

The objects mentioned above and others which will be more apparent below are achieved through a spectacle frame constructed in accordance with the appended claims.

BRIEF DESCRIPTION OF THE DRAWINGS

Further characteristics and advantages of the invention will be more apparent from the following detailed description of preferred embodiments illustrated by way of indication and without limitation with reference to the appended drawings in which:

FIG. 7 is a perspective view of the detail in FIG. 3 in a further variant embodiment in which the temple arm allows for excessive opening movement beyond the normally open condition, FIG. 8 is a perspective exploded view on a magnified scale of the detail in FIG. 7, FIG. 9 is a lateral elevation view of the detail in FIG. 8.

PREFERRED EMBODIMENTS OF THE INVENTION

Figure 1:
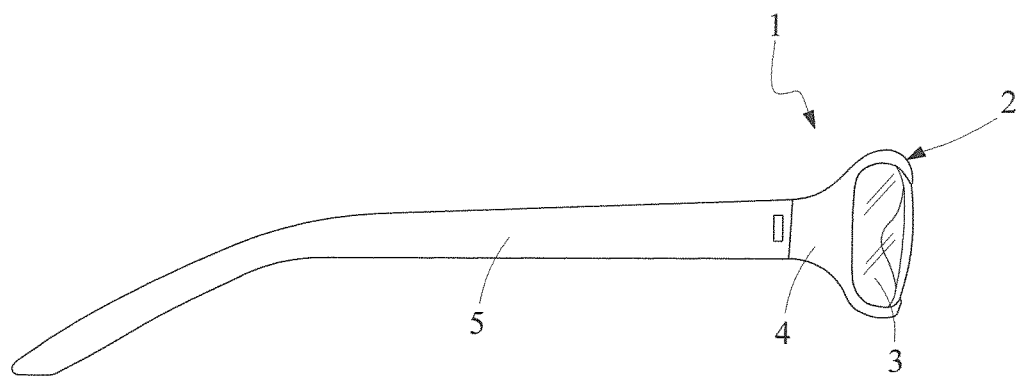
FIG. 1 is a lateral elevation view of a spectacle frame constructed in accordance with this invention.
Figure 2:
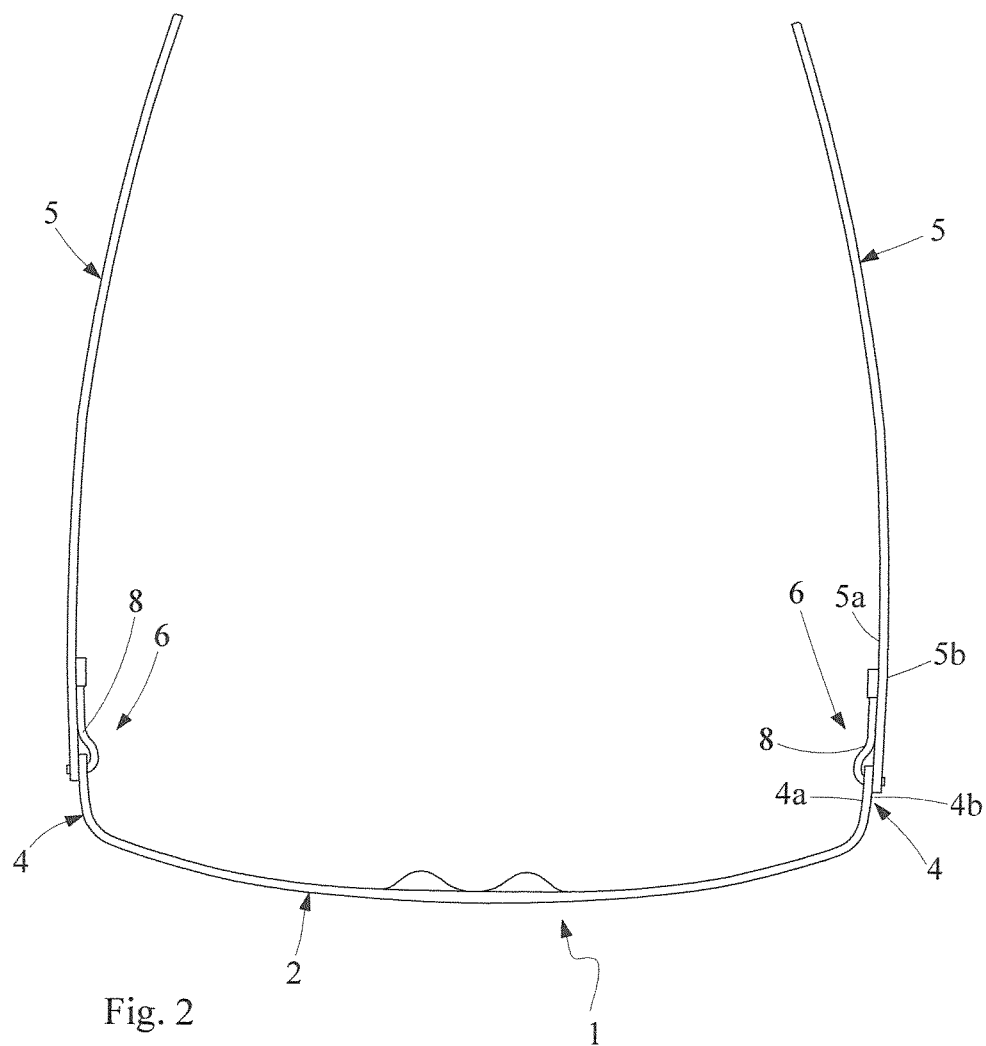
FIG. 2 is a plan view from above of the frame in FIG. 1.

With reference to the figures mentioned, 1 indicates as a whole a frame for spectacles constructed according to this invention comprising a front frame 2 for holding lenses 3 provided with a pair of opposing lateral projections 4 intended for the articulated connection between corresponding temple arms 5 and the front frame.

For articulated attachment of each temple arm 5 to corresponding projection 4, the frame comprises corresponding articulation means, indicated as a whole by 6, capable of permitting rotation between the corresponding positions in which the temple arm is open and closed with respect to the front frame.

Because they have identical structure and function, the articulation means for only one of the temple arms to the front frame of the frame will be described below in detail.

As will be apparent from the figures, temple arms 5 and corresponding projections 4 have a preferred thin strip-like shape. In other words the transverse cross-section of the temple arm (and the corresponding projection) has a vertical dimension of the temple arm measured substantially parallel to the temporal zone of the head when the spectacles are worn which is very much greater than the thickness of the temple arm measured transversely to the height. The shape of the thin section together with the chosen materials from which it is made, preferably metals, as a whole provides great lightness the temple arm with properties of great lightness, smaller dimensions, and a particularly slender longitudinal extension of the temple arm such that the overall design of the frame has a desirable aesthetic impact.

In accordance with the abovementioned strip-shaped structure, the thickness of temple arm 5 is defined between its opposing lateral faces 5a, 5b, while the thickness of corresponding projection 4 is similarly bounded by the opposing lateral faces 4a, 4b of the projection.

5c also indicates the extremity of temple arm 5 facing corresponding projection 4, located longitudinally opposite the terminal extremity of the temple arm, suitable for supporting the frame in the vicinity of the ears. In turn corresponding projection 4 has its end portion indicated by 4c facing extremity 5c of the temple arm, end portion 4c terminating in a corresponding free edge 7 of the projection.

In accordance with the principal characteristic of the invention articulation means 6 comprises a resiliently yielding element indicated by 8 which is structurally independent of projection 4 and temple arm 5, the element having its first extremity 8a attached to temple arm 5 and a second opposing extremity 8b. This extremity 8b is engaged with predetermined coupling play in an opening 9 passing through the thickness of projection 4, opening 9 being made in end portion 4c of the projection at a distance from free edge 7 facing the temple arm such that portion 4c of the projection extending between edge 7 and opening 9 remains enclosed and held between resilient element 8 and temple arm 5 to perform a corresponding hinge movement between projection 4 and temple arm 5 through relative movement between extremity 8b of resilient element 8 and opening 9 in the projection.

Resilient element 8 also has a strip-shaped structure and is preferably made as a thin resilient strip of metal material. Element 8 will have predetermined resilience based on the choice of material and the dimensions of the strip. In accordance with a preferred choice resilient element 8 is made of steel, in particular steel of the class "AISI 301" which is advantageously suitable for the manufacture of components intended to deform resiliently, typical of spring steels because of their ability to return resiliently and their resistance to breakage (generally achieved through suitable heat treatment of the component). In addition to special behaviour in the resilient field, the abovementioned class of steel also offers optimum corrosion resistance and good weldability.

The strip of resilient element 8 is arranged so that it overlaps the portion of the temple arm close to extremity 5c, mainly bearing against face 5a of the temple arm, that is the face facing the inside of the frame, that facing the head when the spectacles are worn.

Figure 3:
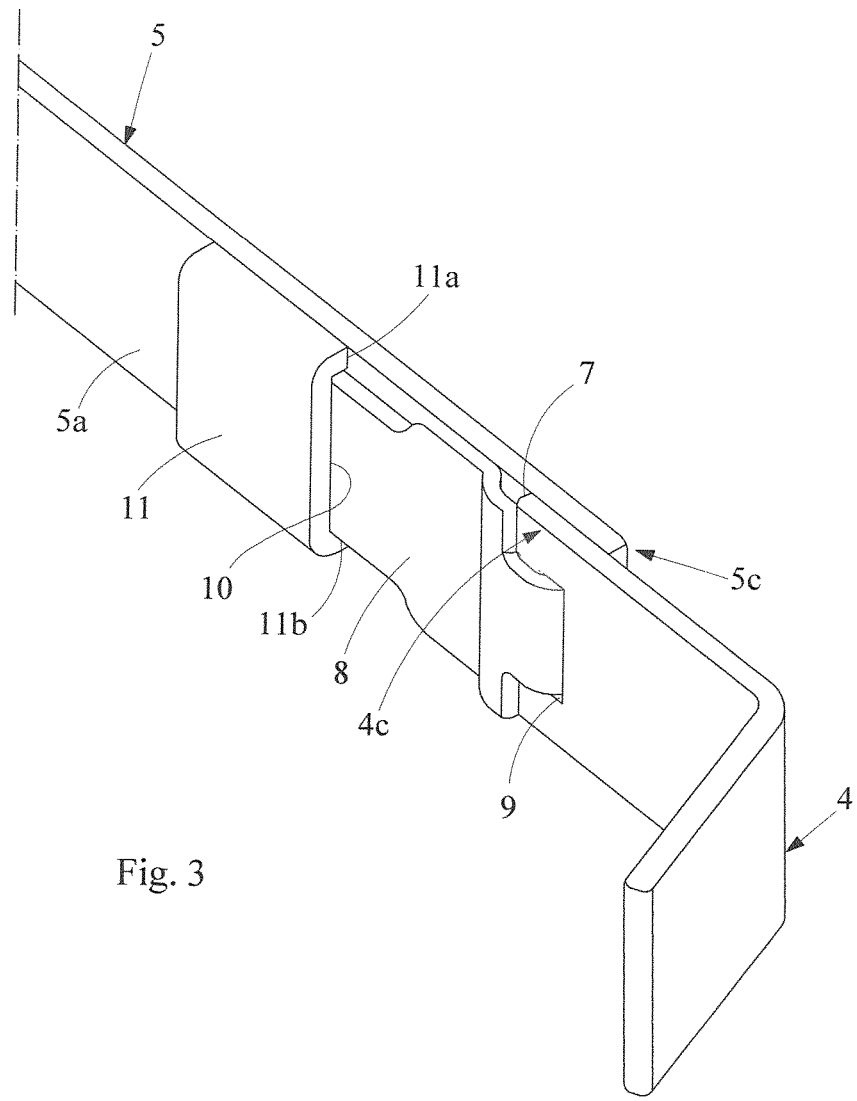
FIG. 3 is a view in partial cross-section and on a magnified scale of a detail of the frame in the preceding figures.

Extremity 8a of the strip element is also secured to temple arm 5 by engaging that extremity through an embedded coupling in a seat 10 formed jointly by temple arm 5 and a bridge body 11 attached to the temple arm, preferably by welding. As is shown in FIG. 3, bridge 11 remains within the lateral dimensions of the temple arm, and is attached to the inner face 5a of the temple arm by welding its opposing projections 11a, 11b to face 5a, extremity 8a of the strip element being inserted so that it is embedded in seat 10.

At the opposite extremity 8b resilient strip element 8 is folded in an arcuate way through approximately 90° with respect to the plane of the strip in order to engage opening 9 passing through the projection transversely to the longitudinal direction of extension of the temple arm until it abuts against a portion 5c at the extremity of the temple arm. In this way end portion 4c of projection 4 is held between strip element 8 and temple arm 5 and can be moved in rotation with respect to the temple arm against the resilient returning force of the resilient strip.

The transverse cross-sections of opening 9 and extremity 8b of the strip element, which are designed to engage each other and are preferably selected to have a rectangular profile, have dimensions such as to provide coupling play between the parts such that extremity 8b of the strip can move within opening 9 through movement limited by the width of the opening (measured in the longitudinal direction along which the projection and the temple arm extend). This movement is a combined rotational and translational movement through which consequent relative movement of the articulation between the temple arm and the projection takes place.

Figure 5:
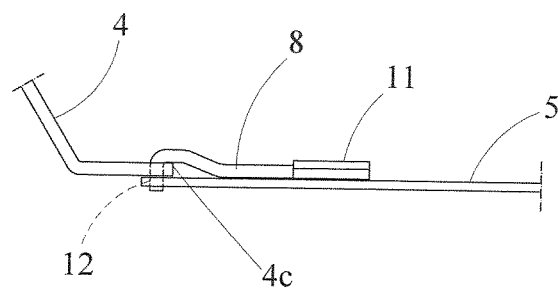

The part of extremity 8b of strip 8 which pass beyond opening 9 in the direction of temple arm 5 is housed with limited play in a cavity 12 provided in the thickness of the temple arm, this cavity being preferably made so as to pass through the thickness of the temple arm, as clearly illustrated in the figures. During relative rotational movement between the projection and the temple arm, between the position in which the temple arm is open (FIG. 5) and the position in which it is closed (FIG. 6), strip element 8 tends to bend away from the temple arm (deforming resiliently), thus bringing about a consequent relative movement between extremity 8b of the strip and cavity 12 in which it is housed. Cavity 12 is selected to have a shape and dimensions such that extremity 8b of the strip nevertheless remains within the cavity throughout the relative movement between the temple arm and the projection in order to ensure stability and mutual guidance between the coupled parts.

Figure 6:
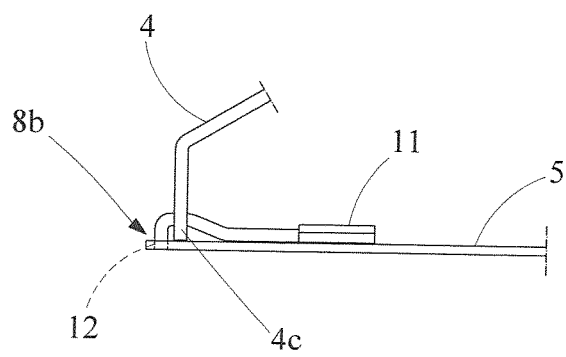

FIG. 6 shows the operating condition with temple arm 5 closed against the frame, in which following relative rotation between the projection and the temple arm end portion 4c of the projection achieves a configuration in which it is substantially perpendicular with respect to extremity 5c of the temple arm, with free edge 7 of the projection, in supporting contact against the temple arm. During the opposite movement of rotation to open the temple arm towards the configuration in FIG. 5, the resilient returning force exerted by strip element 8 through the effect of its deformation assists the movement opening the temple arm, accompanying it, until it reaches the condition in which the temple arm is open. In this condition end portion 4c of the projection substantially overlaps corresponding extremity portion 5c of the temple arm, with face 4b of the projection and face 5a of the temple arm in supporting surface contact.

A metal material, for example steel, and in particular a steel offering good weldability (for attaching the bridge to the temple arm), good corrosion resistance and sufficient mechanical strength, is preferably used to construct the body of temple arm 5, projection 4 and bridge 11 attaching strip element 8, especially in the circumstances where temple arms are constructed with particularly thin cross-sections. A preferred choice may fall for example within the AISI 316L class of steels.

Thanks to one of the main features of the invention according to which resilient strip element 8 is structurally independent of both temple arm 5 and projection 4 it is advantageously possible to select different materials for the temple arm and the resilient strip in an attempt to optimise choice in relation to the functional features required, or opt for a material which has very good resilient properties when manufacturing the strip (e.g. spring steel), as well as a material having good weldability, mechanical strength and corrosion resistance when manufacturing the temple arm, in addition to the projection and the bridge attaching the strip.

Figure 4:
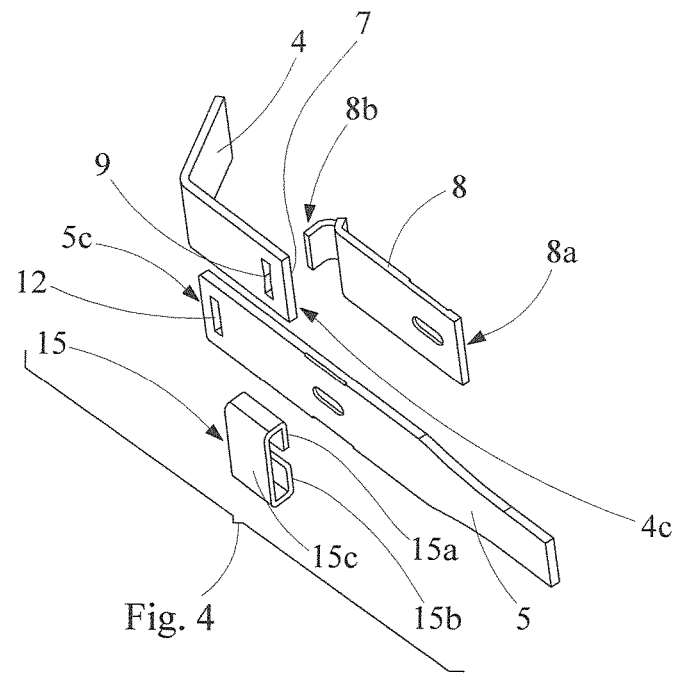
FIG. 4 is an exploded perspective view of the detail in FIG. 3, in a variant embodiment.
Figure 4A:
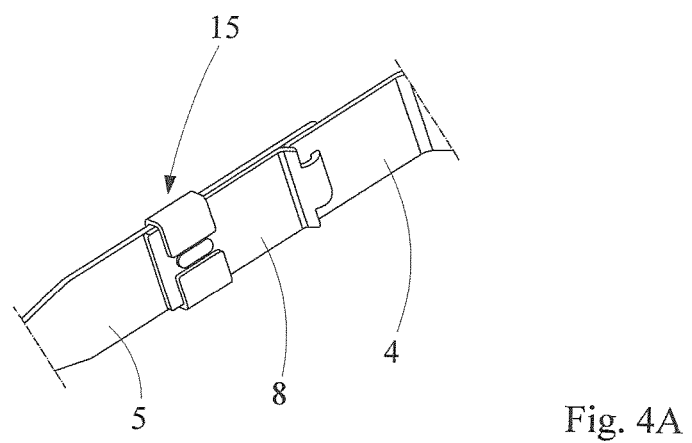
FIG. 4A is a perspective view of assembled parts of the detail in FIG. 3, FIGS. 5 and 6 are partial lateral elevation views of the detail in FIG. 3, illustrated in two respective different operating positions relating to full opening of the temple arm and closure of the temple arm against the frame.

FIGS. 4 and 4A illustrate a variant embodiment of frame 1 which differs from the previous embodiment mainly in the fact that it provides for the formation of an elastic clip, indicated by 15, as a means of securing strip element 8 to temple arm 5. The clip has a pair of limbs 15a, 15b rising from a base 15c opposite them, suitable for pressure fitting extremity 8a of the strip element to temple arm 5 at a predetermined distance from free extremity 5c.

FIGS. 7 to 9 illustrate a further variant of the frame which differs from the first embodiment described mainly in the fact that temple arms 5 of the frame are also designed to perform a wider opening movement with corresponding resilient return to the open condition. In other words the means for articulating temple arms 5 to corresponding projections 4 are designed in such a way that temple arms 5 can be opened beyond the normal opening position in order to be returned to that position when released.

In order to allow relative movement between extremity 8b of resilient element 8 and opening 9 in projection 4, when the temple arm is being opened extra wide it is provided that the width of opening 9 measured in the direction of longitudinal extension is larger than that provided in the frame in the previous embodiment (without wider opening of the temple arm) such that extremity 8b can move within the opening (through a combined rotational/translational movement) over the entire forward and backward movement of the temple arm from the closed position, passing through the open position, to the extra-wide position.

The frame also comprises means to limit the rotation of temple arm 5 in the extra-wide direction in order to allow the temple arm to move to a predetermined maximum value of the angle between the temple arm and the front frame in the extra-wide open condition.

The limiting means comprise an appendage 18 projecting from end portion 4c of projection 4 which can be housed in a manner in which its movement is limited in a slot 19 passing through the thickness of strip element 8. This through slot is located close to extremity 8b of strip element 8 and at its extremity has a contact surface 19a against which appendage 18 abuts in the position in which the temple arm is opened extra wide.

Appendage 18 is preferably made in the form of a tooth projecting from face 4a of the projection (that facing strip element 8), this tooth remaining flush with the free edge 7 of end portion 4c of the projection, as is clearly illustrated in FIG. 8.

When temple arm 5 opens extra wide it is provided that appendage 18 interferes with abutment surface 19a, abutting against it, when the temple arm is opened to its permitted maximum in the extra wide position, thus preventing further movement of the temple arm. From this condition, when the temple arm is released temple arm 5 is returned to the open position as a result of the resilient return force exercised by resilient strip element 8.

This invention thus accomplishes the stated objects while providing many advantages in comparison with known solutions.

One main advantage lies in the fact that because a resilient element is provided between the projection and temple arm, constructed independently of the temple arm, it is possible to use different construction materials for the temple arm and the resilient element respectively, optimising the functional requirements of each of these components of the frame.

Another advantage lies in the fact that the frame according to the invention allows the elements of the articulation between the projection and the temple arm to be assembled easily and quickly without the provision of screw or threaded pin means to provide a hinge articulation, thus being advantageously reliable over time and further offering simpler operation when it is assembled/dismantled.

Yet another advantage lies in simplicity of construction and the limited number of components in the device, characteristics which make it possible to construct spectacles of a particularly light type having extremely small overall dimensions.

The invention claimed is:

1. A frame for spectacles comprising a front frame (2) with respective lateral projections (4) for the articulation of respective temple arms (5) and articulation means for an articulated connection between the temple arm and the front frame, wherein respective lateral projections (4) comprise an opening (9) at a distance from a free edge (7) and a portion (4c) extending between the opening (9) and the free edge (7), wherein the articulation means comprise a resiliently yielding element (8) which is structurally independent of the projection (4) and the temple arm (5), said element (8) having a first extremity (8a) attached to the temple arm (5) and a second opposing extremity (8b) engaged with predetermined coupling play in the opening (9) passing through the projection (4), the opening (9) being at a distance from a free edge (7) of the projection facing the temple arm (5), in such a way that the portion (4c) of the projection extending between the edge (7) and the opening (9) remains held between the resilient element (8) and the temple arm (5) in order to perform a hinge movement through relative movement of the second extremity (8b) of the resilient element (8) in the opening (9) in the projection (4) and wherein the second extremity (8b) of the element (8) is bent so as to engage the opening (9) passing through the projection (4) transversely to a direction of longitudinal extension of the temple arm (5) until the second extremity (8b) abuts a part (5c) of the extremity of the temple arm facing the projection such that the portion (4c) of the projection is held between the element (8) and the temple arm (5) and can be moved in rotation with respect to the temple arm against the resilient returning force of the element (8).

2. The frame for spectacles according to claim 1, wherein the resiliently yielding element (8) has a strip-shaped structure of predetermined resilience.

3. The frame according to claim 1, wherein the element (8) is constructed in the form of a strip of metal material.

4. The frame according to claim 1, wherein the first extremity (8a) of the element (8) is received with embedded coupling in a seat (10) formed jointly by the temple arm (5) and a bridge body (11) attached to the temple arm.

5. The frame according to claim 4, wherein the bridge body (11) is attached to the corresponding temple arm (5) by welding.

6. The frame according to claim 1, wherein the portion (4c) of the projection and the part (5c) of the extremity of the temple arm are arranged so that they at least partly overlap in a condition in which the temple arm (5) is open, part (5c) of the extremity of the temple arm having a cavity (12) capable of receiving the extremity (8b) of the element (8) passing through the opening (9) in the projection.

7. The frame according to claim 6, wherein at least the portion (4c) of the projection and the part (5c) of the extremity of the temple arm are in the shape of a strip, the portion of the projection and the part of the extremity of the temple arm being arranged so that surfaces thereof overlap each other in a condition in which the temple arm (5) is open, the portion (4c) of the projection being capable of rotating with respect to the temple arm (5) against a resilient force of the resiliently yielding element (8) until it reaches a configuration in which the portion (4c) of the projection and the part (5c) of the extremity of the temple arm are positioned substantially perpendicular to each other, in a condition in which the temple arm (5) is closed against the frame.

8. The frame according to claim 1, wherein the temple arm is structured such that it is capable of opening extra-wide with respect to the frame and further comprising means to limit rotation of the temple arm (5) in a direction in which the temple arm opens extra-wide with respect to the frame.

9. The frame according to claim 8, wherein the limiting means comprises at least one appendage (18) projecting from the portion (4c) of the projection which can interfere with a contact surface (19a) provided on the resilient element (8), the appendage (18) abutting against said contact surface (19a) at a predetermined permitted maximum angle of the temple arm (5) when the temple arm (5) is opened extra-widely with respect to the frame.

10. The frame according to claim 9, wherein the contact surface (19a) is defined at one of the opposite extremities of a slot (19) passing through the resiliently yielding element (8), the appendage (18) being received in the slot (19) in such a way that the appendage (18) can move in a limited way between the opposing extremities of the slot (19).

11. A frame for spectacles comprising a front frame (2) with respective lateral projections (4) for the articulation of respective temple arms (5) and articulation means for an articulated connection between the temple arm and the front frame, wherein respective lateral projections (4) comprise an opening (9) at a distance from a free edge (7) and a portion (4c) extending between the opening (9) and the free edge (7), wherein the articulation means comprise a resiliently yielding element (8) which is structurally independent of the projection (4) and the temple arm (5), said element (8) having a first extremity (8a) attached to the temple arm (5) and a second opposing extremity (8b) engaged with predetermined coupling play in the opening (9) passing through the projection (4), the opening (9) being at a distance from a free edge (7) of the projection facing the temple arm (5), in such a way that the portion (4c) of the projection extending between the edge (7) and the opening (9) remains held between the resilient element (8) and the temple arm (5) in order to perform a hinge movement through relative movement of the second extremity (8b) of the resilient element (8) in the opening (9) in the projection (4) wherein the temple arm is structured such that it is capable of opening extra-wide with respect to the frame and further comprising means to limit rotation of the temple arm (5) in a direction in which the temple arm opens extra-wide with respect to the frame wherein the limiting means comprises at least one appendage (18) projecting from the portion (4c) of the projection which can interfere with a contact surface (19a) provided on the resilient element (8), the appendage (18) abutting against said contact surface (19a) at a predetermined permitted maximum angle of the temple arm (5) when the temple arm (5) is opened extra-widely with respect to the frame and wherein the appendage (18) is constructed in the form of a tooth projecting from the projection (4) in such a way as to remain flush with the free edge (7) of the projection.

\* \* \* \* \*